US012138942B2

(12) United States Patent
Malone et al.

(10) Patent No.: US 12,138,942 B2
(45) **Date of Patent: *Nov. 12, 2024**

(54) MEDIA CARTRIDGE AND MEDIA PROCESSING DEVICE ENGAGEMENT MECHANISMS

(71) Applicant: ZEBRA TECHNOLOGIES CORPORATION, Lincolnshire, IL (US)

(72) Inventors: Morgan Hassan Malone, Swansea, MA (US); Raymond E. Maynard, Westerly, RI (US); Steve Ting Kei Chow, Monterey Park, CA (US); Michael F. St.Germain, West Warwick, RI (US); Angel B. Rosales, Port Hueneme, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,932

(22) Filed: Jan. 9, 2023

(65) Prior Publication Data

US 2023/0158819 A1 May 25, 2023

Related U.S. Application Data

(63) Continuation of application No. 17/071,593, filed on Oct. 15, 2020, now Pat. No. 11,548,302.

(51) Int. Cl.
*B41J 3/407* (2006.01)
*B41J 15/04* (2006.01)
(Continued)

(52) U.S. Cl.
CPC .......... *B41J 3/4075* (2013.01); *B41J 15/044* (2013.01); *B41J 29/02* (2013.01); *B41J 29/18* (2013.01); *B41J 29/393* (2013.01); *B41J 29/52* (2013.01)

(58) Field of Classification Search
CPC ........ B41J 29/02; B41J 3/4075; B41J 15/044; B41J 29/18; B41J 29/393; B41J 29/52
See application file for complete search history.

(56) References Cited

U.S. PATENT DOCUMENTS 3,246,742 A 4/1966 Coe
1,033,560 A 7/1977 Frey
(Continued)

FOREIGN PATENT DOCUMENTS

AU 2014212550 9/2015
EP 0807530 A1 11/1997
(Continued)

OTHER PUBLICATIONS

Office Action for U.S. Appl. No. 16/844,755 mailed on Sep. 7, 2021.
(Continued)

*Primary Examiner* — Sharon Polk

(57) ABSTRACT

A printer configured to contain a media cartridge, wherein the media cartridge includes: a base defining a media chamber and including a lower wall and an opposing upper wall; an identification circuit disposed on the lower wall, the identification circuit configured to engage with an electronic interface of a printer; a ledge on the upper wall of the base, the ledge configured to receive downward pressure from an inner surface of a lid of the printer in a closed position; wherein the identification circuit is aligned with the ledge to receive at least a portion of the downward pressure.

13 Claims, 9 Drawing Sheets

(51) Int. Cl.

| | |
|---|---|
| *B41J 29/02* | (2006.01) |
| *B41J 29/18* | (2006.01) |
| *B41J 29/393* | (2006.01) |
| *B41J 29/52* | (2006.01) |

(56) References Cited

U.S. PATENT DOCUMENTS

| | | | | |
|---|---|---|---|---|
| 4,033,560 | A * | 7/1977 | Frey | B41J 13/03 226/114 |
| 4,431,139 | A | 2/1984 | Barnsbee et al. | |
| 5,245,376 | A | 9/1993 | Takahashi | |
| 6,457,804 | B1 | 10/2002 | Scholtz et al. | |
| 11,548,302 | B2 * | 1/2023 | Malone | B41J 29/393 |
| 2005/0284975 | A1 | 12/2005 | Fukushima | |
| 2008/0080918 | A1 | 4/2008 | Caveney et al. | |
| 2008/0151298 | A1 | 6/2008 | Kurotsu | |
| 2009/0033990 | A1 | 2/2009 | Matsugashita | |
| 2011/0210198 | A1 | 9/2011 | Case et al. | |
| 2012/0027494 | A1 | 2/2012 | Kawashima et al. | |
| 2013/0067460 | A1 | 3/2013 | Shapiro | |
| 2013/0194612 | A1 | 8/2013 | Nishida | |
| 2014/0320582 | A1 | 10/2014 | Sauvage | |
| 2015/0022611 | A1 | 1/2015 | Taylor | |
| 2015/0124037 | A1 | 5/2015 | Terry et al. | |
| 2016/0288548 | A1 | 10/2016 | Block et al. | |
| 2016/0368290 | A1 | 12/2016 | Sakano | |
| 2018/0117935 | A1 | 5/2018 | Oida et al. | |
| 2019/0257691 | A1 | 8/2019 | Jeong et al. | |
| 2019/0354922 | A1 | 11/2019 | Berti et al. | |
| 2021/0316560 | A1 | 10/2021 | Chow et al. | |
| 2023/0158819 | A1 | 5/2023 | Malone et al. | |

FOREIGN PATENT DOCUMENTS

| | | | | |
|---|---|---|---|---|
| JP | 3586449 | | 11/2004 | |
| JP | 2017056583 | A * | 3/2017 | B41J 11/42 |
| WO | 20120098891 | | 7/2012 | |
| WO | 2021207456 | | 10/2021 | |

OTHER PUBLICATIONS

Office Action for U.S. Appl. No. 16/844,755 mailed on May 30, 2023.

Preliminary Search Report for French Patent Application No. FR2103598 mailed on Dec. 12, 2022.

Search Report for Dutch Patent Application No. 2027890 mailed on Nov. 18, 2021.

Novelty Search Report for Belgian Patent Application No. 2021/5281 mailed on Jan. 5, 2022.

International Search Report and Written Opinion for International Application No. PCT/US2021/026322 mailed on Apr. 8, 2021.

Office Action for U.S. Appl. No. 17/071,593 mailed on Apr. 14, 2022.

Novelty Search Report for Belgian Patent Application No. 202105815 mailed on Jul. 6, 2022.

Office Action for U.S. Appl. No. 18/094,932 mailed on Jul. 19, 2023.

International Search Report and Written Opinion for International Application No. PCT/US2021/54720 mailed on Mar. 1, 2022.

International Search Report and Written Opinion for International Appl. No. PCT/US2024/15162 mailed on May 22, 2024.

German Office Action from German Patent Office mailed Jun. 28, 2024.

* cited by examiner

MEDIA CARTRIDGE AND MEDIA PROCESSING DEVICE ENGAGEMENT MECHANISMS

CROSS-REFERENCE TO RELATED APPLICATIONS

This application is a continuation of U.S. patent application Ser. No. 17/071,593, filed Oct. 15, 2020, the entire contents of which is incorporated by reference herein.

BACKGROUND

A media processing device, such as a label printer, may store a supply of media for processing, e.g. by printing or otherwise applying indicia to the media. When the supply of media stored by the media processing device is exhausted, the supply may be replenished by accessing an interior of the device to install a new supply, such as a new roll of labels. Replenishing the supply of media in the above manner, however, may be time-consuming and prone to improper installation of the media, which may negatively impact the performance of the media processing device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
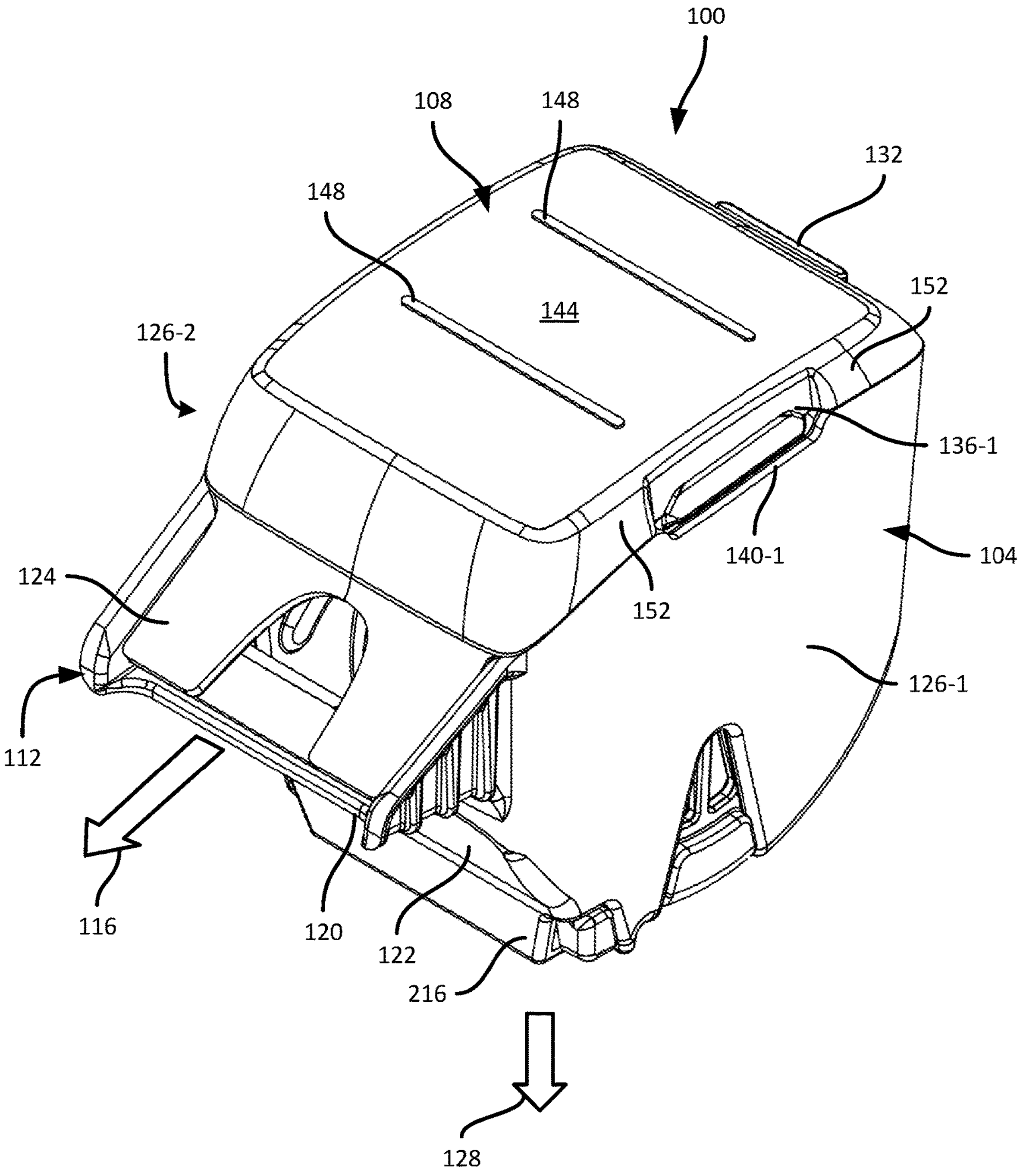
FIG. 1 is an isometric view of a media cartridge, taken from above.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Media supplies, such as rolls of labels used in printers, require periodic replacement, e.g. when the media supported by the roll or other structure is exhausted. Label printers may require media to be fed through a system of rollers within the printer, which complicates the loading and unloading process, and may lead to incorrectly installed media supplies.

A replaceable media cartridge containing the above media supply may mitigate some of the above complication by providing a drop-in mechanism to load new media into a printer. As will be apparent to those skilled in the art, such cartridges may have various physical features to mitigate operational issues in the printer, such as media jams and the like. Third-party cartridges (e.g. those manufactured by an entity other than the manufacturer of the printer) may lack such features, or imperfectly reproduce such features, leading to suboptimal printing and/or damage to the printer. Printer and media manufacturers may therefore implement mechanisms to warn operators or interrupt printer operation when such a third-party cartridge is installed in the printer. Some mechanisms may involve the physical placement of components of the cartridge, such as an identification chip (also known as an 'ID chip'), in contact with components of the printer, such as an electrical interface to read the above chip. Imperfect contact between the chip and the interface may lead to interruptions in printer operation.

Cartridge features, and complementary printer features, are discussed herein that ensure good contact between the above ID chip and the printer interface, and/or that further simplify the removal and installation of the cartridge.

Examples disclosed herein are directed to a media cartridge, comprising: a base defining a media chamber and including a lower wall and an opposing upper wall; an identification circuit disposed on the lower wall, the identification circuit configured to engage with an electronic interface of a printer; a ledge on the upper wall of the base, the ledge configured to receive downward pressure from an inner surface of a lid of the printer in a closed position; wherein the identification circuit is aligned with the ledge to receive at least a portion of the downward pressure.

Additional examples disclosed herein are directed to a media cartridge, comprising: a base defining a media chamber having a mouth for receiving a supply of media; a cover including: a perimeter configured to engage the mouth of the media chamber and enclose the media chamber; and a guide feature defining a portion of the cover configured to be grasped to manipulate the cartridge for installation or removal from a printer.

Further examples disclosed herein are directed to a printer, comprising: a housing defining a media enclosure configured to receive a media cartridge, the media enclosure having a lower wall to support the media cartridge, opposing side walls, a rear wall and a forward wall defining a media outlet; a lid rotatably coupled to the housing and movable between a closed position to enclose the media enclosure, and an open position; an electronic interface at the lower wall, configured to engage with an identification chip of the media cartridge; a contact region on an inner surface of the lid, the contact region configured to exert a downward pressure on the media cartridge when the lid is in the closed position; wherein the electronic interface is aligned with the ledge to transfer the downward pressure from the contact region to the electronic interface via the identification chip.

FIG. 1 depicts a media cartridge 100, also referred to herein simply as the cartridge 100. The cartridge 100 is configured to store a supply of media, such as a roll of adhesive labels, paper or the like, although the cartridge 100 is illustrated in an empty state in FIG. 1.

The cartridge 100 includes a base 104 that defines a media chamber to contain the above-mentioned media roll. The cartridge 100 also includes a cover 108 that is configured, when the cartridge 100 is assembled as shown in FIG. 1, to engage with the base 104 to enclose the above-mentioned media chamber. The cover 108 can also be coupled to certain internal components of the cartridge 100 that support the media roll, as will be seen below.

The cartridge 100 includes a media outlet 112 from which media is dispensed from the media chamber, e.g. in the direction 116 indicated in FIG. 1. The media may be dispensed from the cartridge 100 under the action of one or more components of a media processing device such as a printer. Examples of such components include a platen roller and a print head that together form a nip through which the media is drawn from the cartridge to be processed and subsequently dispensed from the printer.

When the cartridge is fully assembled, the base 104 and cover 108 cooperate to define the media outlet 112, as shown in FIG. 1. To that end, the base 104 includes a lower portion 120 of the media outlet 112, over which the media travels in the direction 116 to exit the cartridge 100. The lower portion 120 of the media outlet 112 can be integrally formed with a forward wall 122 of the base 104. The cover 108 includes an upper portion 124 of the media outlet 112 configured to contact an upper surface of the media as the media exits the cartridge 100, e.g. to mitigate against retraction of the media into the cartridge 100.

In addition to the forward wall 122, the base 104 includes side walls 126-1 and 126-2 (opposite the side wall 126-1, and therefore not visible in FIG. 1). Together with other walls of the base 104 to be discussed below, the side walls 126 define the above-mentioned media chamber.

The cartridge 100 is loaded into a printer in a downwards direction 128, i.e. substantially vertically. Conversely, the cartridge 100 is withdrawn from the printer in a direction opposite to the direction 128, e.g. when the media in the cartridge 100 is exhausted or a different type of media is required. The cartridge 100 includes certain structural features to facilitate the installation and withdrawal of the cartridge 100 into and out of the printer, as well as to maintain a position of the cartridge 100 within the printer when installed.

Specifically, the cartridge 100 includes a ledge 132 that is configured to interact with a component of the above-mentioned printer to exert downward pressure (i.e. a force substantially in the direction 128) when the cartridge 100 is installed within the printer. In addition, the cartridge 100 includes a guide feature, examples of which are discussed below, defining a portion of the cover 108 that is configured to be grasped (e.g. by an operator of the printer) to manipulate the cartridge for installation or removal from the printer.

In the present example the guide feature includes a first grip 136-1 at a first side of the cover 108, implemented as an indentation into the cover 108 relative to the side wall 126-1 of the base 104. In the illustrated example, the indentation defining the grip 136-1 extends into the base 104 itself, in the form of a cutout 140-1 at the upper edge of the side wall 126-1. The cover 108 can include a second grip on the side opposite of the grip 126-1 (not visible in FIG. 1), and the base 104 can also include a second cutout in the side wall 126-2, corresponding to the second grip of the cover 108.

In addition, in the present example the cover 108 includes additional guide features. For example, the cover 108 can include a label-placement region 144, e.g. indicated visually by a pair of ridges 148 extending from an upper surface of the cover 108. A label (not shown) may be placed over the cover 108, extending from the side wall 126-2 to the side wall 126-1 between the ridges 148. As will be apparent, such a label can serve both to affix the cover 108 to the side walls 126 of the base 104, and to provide a visual guide towards the grips 136.

In other examples the cover 108 can include further guide features, such as textured elements (e.g. ridges, channels or the like) on shoulders 152 of the cover 108, providing both visual indications that the shoulders 152 are suitable for grasping the cartridge 100 from above, and surface texture to facilitate such grasping. The grips 136, when present in conjunction with the textured elements on the shoulders 152, may define a gap in the textured elements (e.g. the grips 136 need not include textured elements). In other examples the textured elements may also be present within the grips 136.

Figure 2:
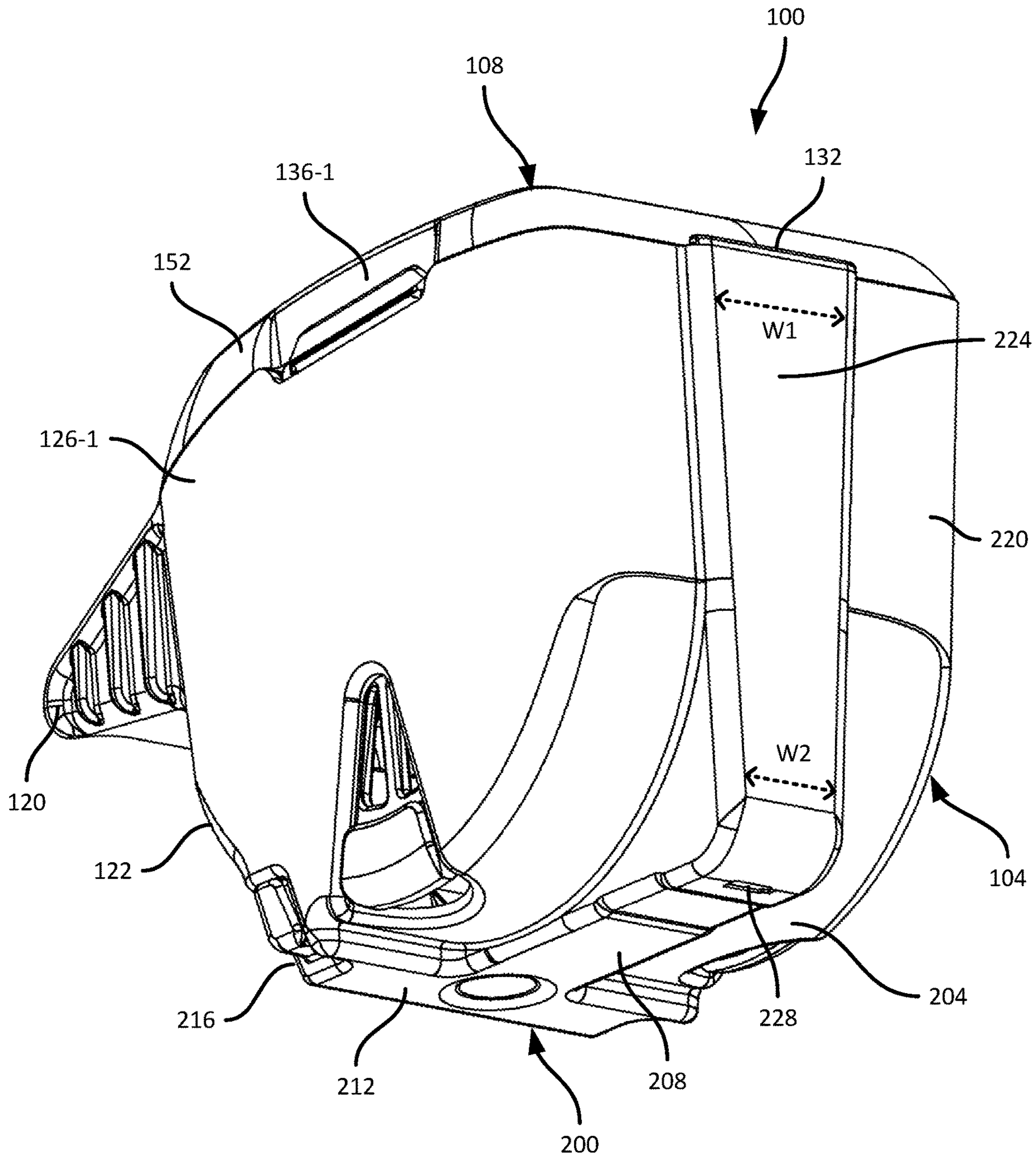
FIG. 2 is an isometric view of the media cartridge of FIG. 1, taken from below.

Turning to FIG. 2, the cartridge 100 also includes structural features to align the cartridge 100 within the printer upon installation. In the illustrated example, the cartridge 100 includes an alignment ridge 200 extending from a lower wall 204 of the base 104. The alignment ridge 200 is configured to engage with a complementary alignment channel of a printer, constraining the position of the cartridge 100 within the printer as the cartridge 100 is installed in the printer (i.e. preventing installation of the cartridge 100 in an incorrect orientation).

In the present example, the alignment ridge 200 is a T-shaped ridge that includes a stem 208 and an arm 212. As seen in FIG. 2 as well as FIG. 1, a forward surface 216 of the arm 212 is contiguous with the forward wall 122 of the base 104. In other examples, however, the arm 212 can be disposed on the lower wall 204 such that the forward surface 216 is spaced apart (rearwardly) from the forward wall 122. In addition, the arm 212 extends across the width (between the side walls 126) of the base 104 in the present example. In other examples, the arm 212 can have a reduced length, such that the arm 212 extends across only a portion of the width of the base 104.

The stem 208 of the alignment ridge 200 is disposed centrally on the lower wall 204 and orthogonal to the arm 212. The stem 208 extends between the arm 212 and a rear end of the lower wall 204, where the lower wall joins a rear wall 220 of the base 104. In other examples, the length of the stem 208 can be reduced. In further examples, the stem 208 can be disposed off-center relative to the arm 212, such that the stem 208 is closer to, for example, the side wall 126-1 than to the opposing side wall 126-2.

The cartridge 100 also includes an additional alignment feature in the present example, in the form of an alignment spine 224 extending from the rear wall 220 of the base 104. The spine 224, in the present example, is contiguous with the stem 208 and extends from the stem 208 to an upper end of the base 104, adjacent to the cover 108. In particular, the ledge 132 is defined at an upper end of the spine 224 in this example, and is therefore located adjacent to the rear edge of the cover 108.

The spine 224 is wedge-shaped in the present example, having a larger width W1 near the upper end of the base 104 (i.e. near the ledge 132) than a width W2 near the stem 208. The spine 224 is configured to engage with a complementary channel of the printer to guide the cartridge 100 into position as the cartridge 100 is inserted into the printer. In other examples, the spine 224 need not be contiguous with the stem 208. For example, the spine 220 can terminate above the lower wall 204 such that the spine 220 does not reach the stem 208.

The cartridge 100 also includes, in the illustrated example, an identification circuit 228 disposed on an outer surface thereof. In the present example, the circuit 228 is disposed on the lower wall 204, and specifically on a lower surface of the stem 208 of the alignment ridge 200. The circuit 228 can be implemented, for example, as a suitable integrated circuit that is readable by the printer upon installation of the cartridge 100, via an electrical interface of the printer. The circuit 228 can store information such as a unique identifier of the cartridge 100, a manufacturer identifier of the cartridge 100, data defining the type and/or initial quantity of media in the cartridge 100, an encryption key or other authentication data, and the like. The circuit 228 may therefore be read by the printer to obtain the above data, and determine, for example, whether the cartridge 100 is manufactured by an approved supplier of media for the printer.

When a cartridge is installed that lacks the circuit 228, or in which the circuit 228 contains data that does not satisfy criteria applied by the printer, the printer may interrupt operation, generate warning notifications, or the like. For example, the printer may simply not operate when the circuit 228 is not detected, or when a detected circuit 228 does not contain information satisfying criteria applied by the printer. In other examples, when the printer fails to detect the circuit 228 or detects a non-compliant circuit, the printer may operate in a mode with reduced functionality (e.g. a safe mode).

As will be apparent to those skilled in the art, consistent contact between the circuit 228 and the corresponding electrical interface in the printer may avoid interruptions, warnings and the like due to loss of communication between the circuit 228 and the printer (rather than due to the cartridge 100 being an authorized cartridge). The ledge 132 introduced in connection with FIG. 1, and also illustrated in FIG. 2, serves to mitigate against loss of connection between the circuit 228 and the printer. In particular, as noted earlier, the ledge 132 receives downward pressure from a component of the printer (in particular, an inner surface of a lid of the printer). The ledge 132 and the circuit 228 are aligned such that a substantial portion of the downward pressure is transferred from the ledge 132 to the circuit 228, driving the circuit 228 into contact with the electrical interface of the printer.

The alignment between the ledge 132 and the circuit 228 will be discussed in greater detail below. In the present example, such alignment is provided, at least in part, by placement of the circuit 228 adjacent to the rear end of the stem 208 (i.e. adjacent to a rear end of the lower wall 204), and by placement of the ledge 132 adjacent to a rear edge of the base 104 (i.e. adjacent to the rear wall 220). That is, a load path between the ledge 132 and the circuit 228 is substantially vertical (e.g. within about 20 degrees of vertical).

Figure 3:
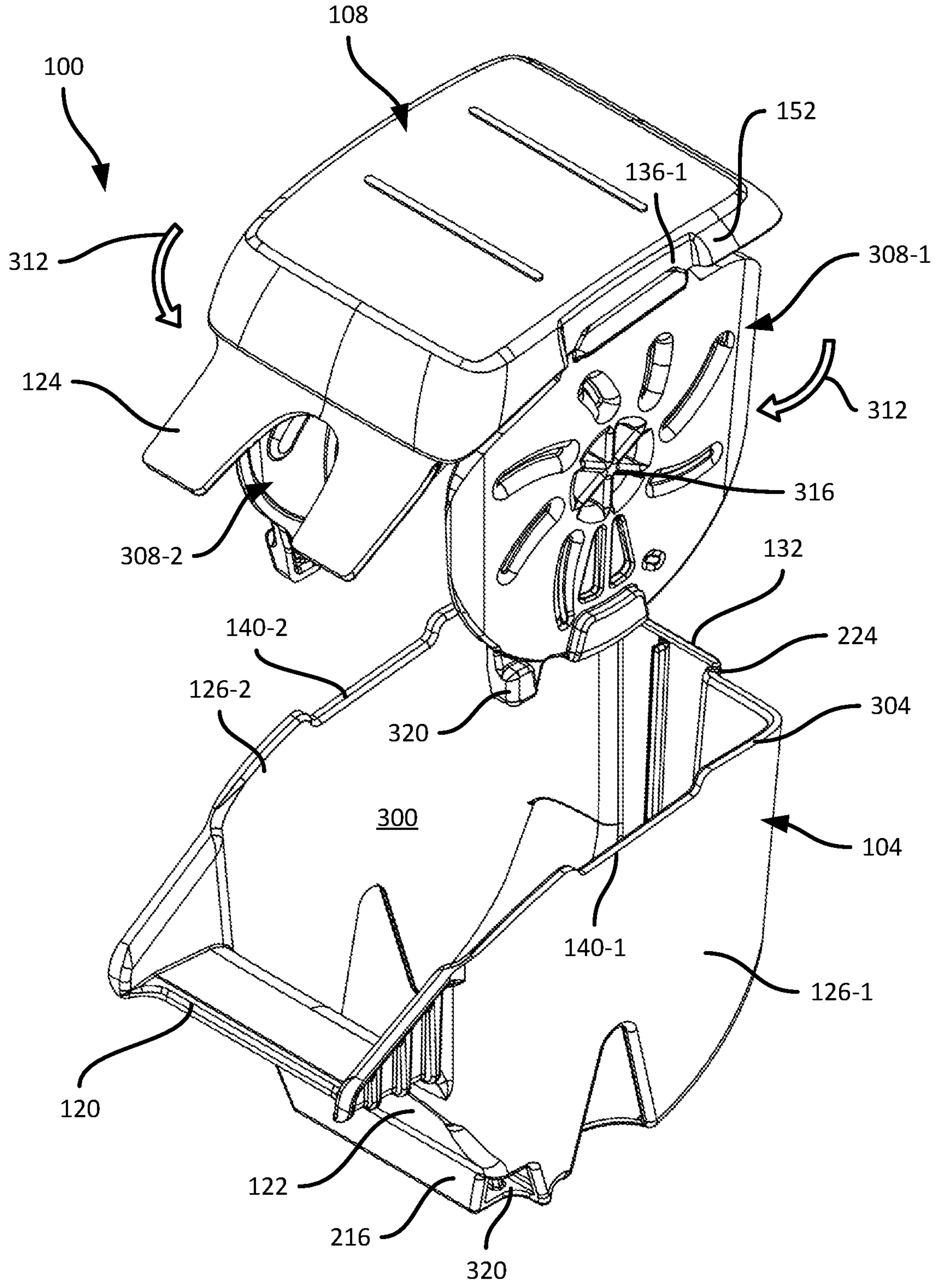
FIG. 3 is an exploded view of the media cartridge of FIG. 1.

Turning to FIG. 3, the cartridge 100 is shown in a disassembled state. In particular, the cover 108 is shown disassembled from the base 104 to reveal the media chamber 300 within the base 104, which houses the media supply when the cartridge 100 is assembled.

The media chamber 300 has a mouth defined by an upper wall 304 of the base 104, which forms a perimeter of the mouth. The ledge 132 extends from a portion of the upper wall 304 defined by the top of the spine 224, and the cutouts 140-1 and 140-2 are defined along portions of the upper wall 304 above each side wall 126.

The cartridge 100 also includes a pair of wings 308-1, 308-2 connected to the cover 108. The wings 308 can be rotatable relative to the cover 108 about joints defined at the grips 136, such as living hinges. The cover 108 and wings 600 can be manufactured as a single integrated component (e.g. via injection molding as mentioned earlier), while the base 104 can be manufactured as a separate component. In some examples, however, the entire cartridge 100 can be manufactured as a single integrated component, e.g. via injection molding. In such examples, the cover 108 can be connected to the base 104 via a hinge (e.g. a living hinge) adjacent to the ledge 132 (with the ledge 132 being rearward of the hinge).

A roll of media can be placed between the wings 308 and below the cover 108, and the wings 308 can then be rotated towards each other as indicated by the arrows 312 to reach the positions illustrated in FIG. 3. Each wing defines a spindle 316 extending inwardly, to support the roll of media. When the roll is supported by the wings 308, the wings 308 are inserted into the media chamber 300 until the cover 108 rests on the upper wall 304 (or at least a portion thereof, excluding the portion bearing the ledge 132).

The wings 308 can include latching features configured to engage with openings 324 in the base 104 to secure the wings 308 and cover 108 to the base following assembly. The above-mentioned label can also serve to affix the cover 108 and wings 308 to the base. As will now be apparent, when the media roll is loaded between the wings 308, the center of gravity of the cartridge 100 is substantially on the axis of rotation defined by the spindles 316. In other words, the center of gravity of the cartridge 100 is directly below (i.e. vertically aligned with) the grips 136, such that when the cartridge is lifted by the grips 136, rotational movement of the cartridge 100 due to gravity is mitigated or avoided.

Figure 4:
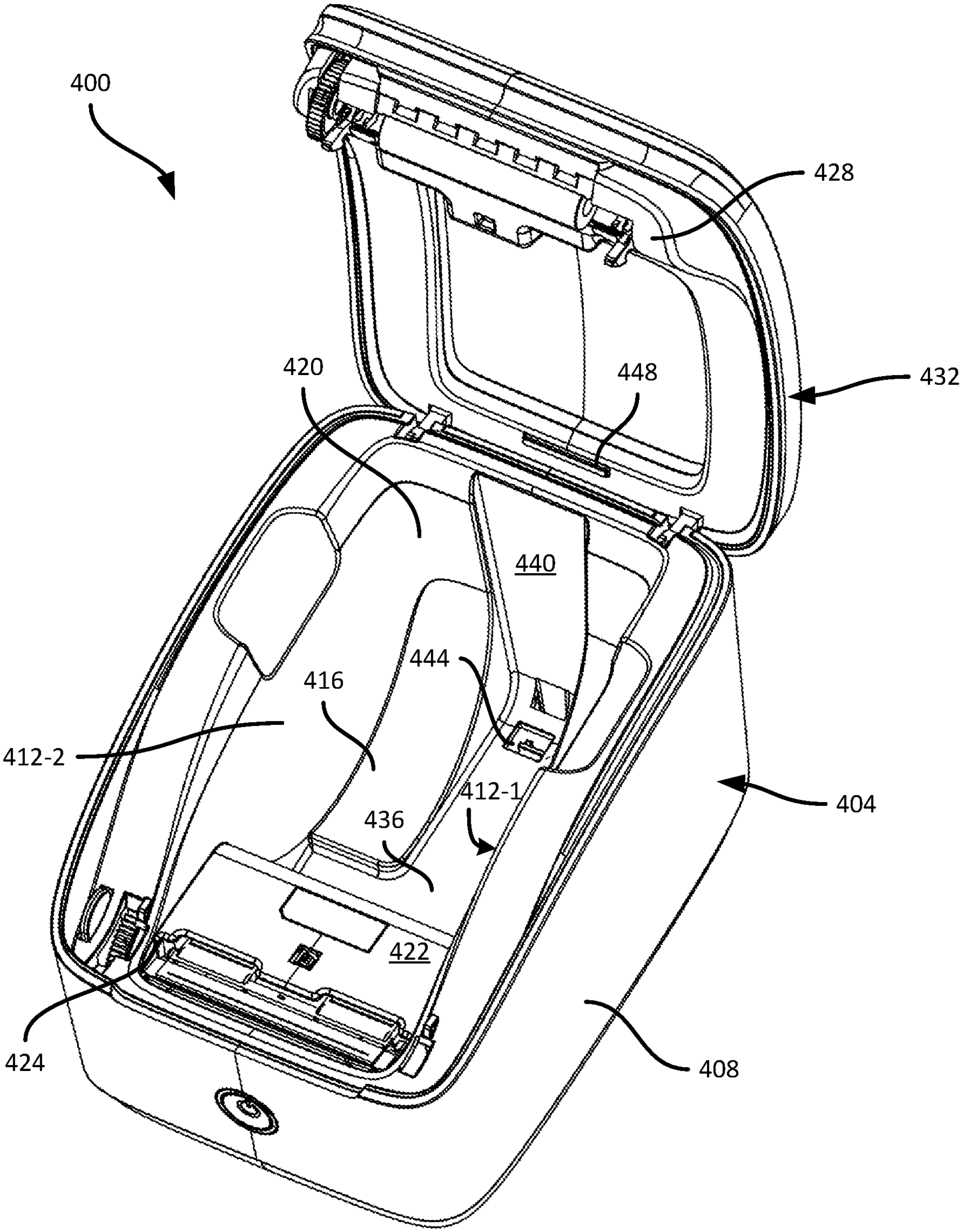
FIG. 4 is a diagram of a printer for use with the media cartridge of FIG. 1.

Turning to FIG. 4, a printer 400 with which the cartridge 100 may be used is illustrated. The printer 400, e.g. a desktop label printer, includes a housing 404 to receive the cartridge 100. The housing 404, in particular, includes a set of inner walls defining a media enclosure, and a set of outer walls 408 encasing the media enclosure and other internal components of the printer 400.

The inner walls include first and second side walls 412-1 and 412-2, a lower wall 416, a rear wall 420, and a forward wall 422. Media from the cartridge is dispensed from the enclosure formed within the housing 404 by way of a print head assembly 424 supported by the housing 404, and a platen roller 428 supported by a lid 432. When the lid 432 is closed, the platen roller 428 cooperates with the print head 424 to form a nip through which media is drawn from the cartridge 100 for processing and dispensing from the printer 400.

The enclosure defined by the inner walls of the housing 404 includes an alignment channel 436 defined in the lower wall 416. The channel 436, in the illustrated example, has a T shape complementary to the shape of the alignment ridge 200 discussed above. The housing 404 also defines a rear alignment channel 440, in the rear wall 420, that is complementary with the shape of the spine 224 discussed above. Thus, as the cartridge 100 is inserted into the printer 400, the spine 224 engages with the channel 440 to guide the ridge 200 into the channel 436. The ridge 200 and spine 224 of the cartridge 100, together with the channels 436 and 440, may also prevent insertion of the cartridge 100 in an incorrect orientation (e.g. with the media outlet 112 facing towards the lid 432 rather than towards the print head 424).

The printer 400 also includes, within the channel 436, an electrical interface 444 configured to engage with the circuit 228 when the cartridge 100 is inserted into the housing 404. The lid 432 is configured to apply downward pressure to the cover 108 above the circuit 228 and the interface 444, to drive the circuit 228 into consistent contact with the interface 444. In particular, the lid 432 includes a contact region, such as a pressure bar 448 on an inner surface thereof. The pressure bar 448 is configured, when the lid 432 rotates from the illustrated open position to a closed position, to exert downwards pressure on the identification circuit 228 via the ledge 132 and spine 224. Such downwards pressure may serve to ensure contact between the circuit 228 and the interface 444.

Figure 5:
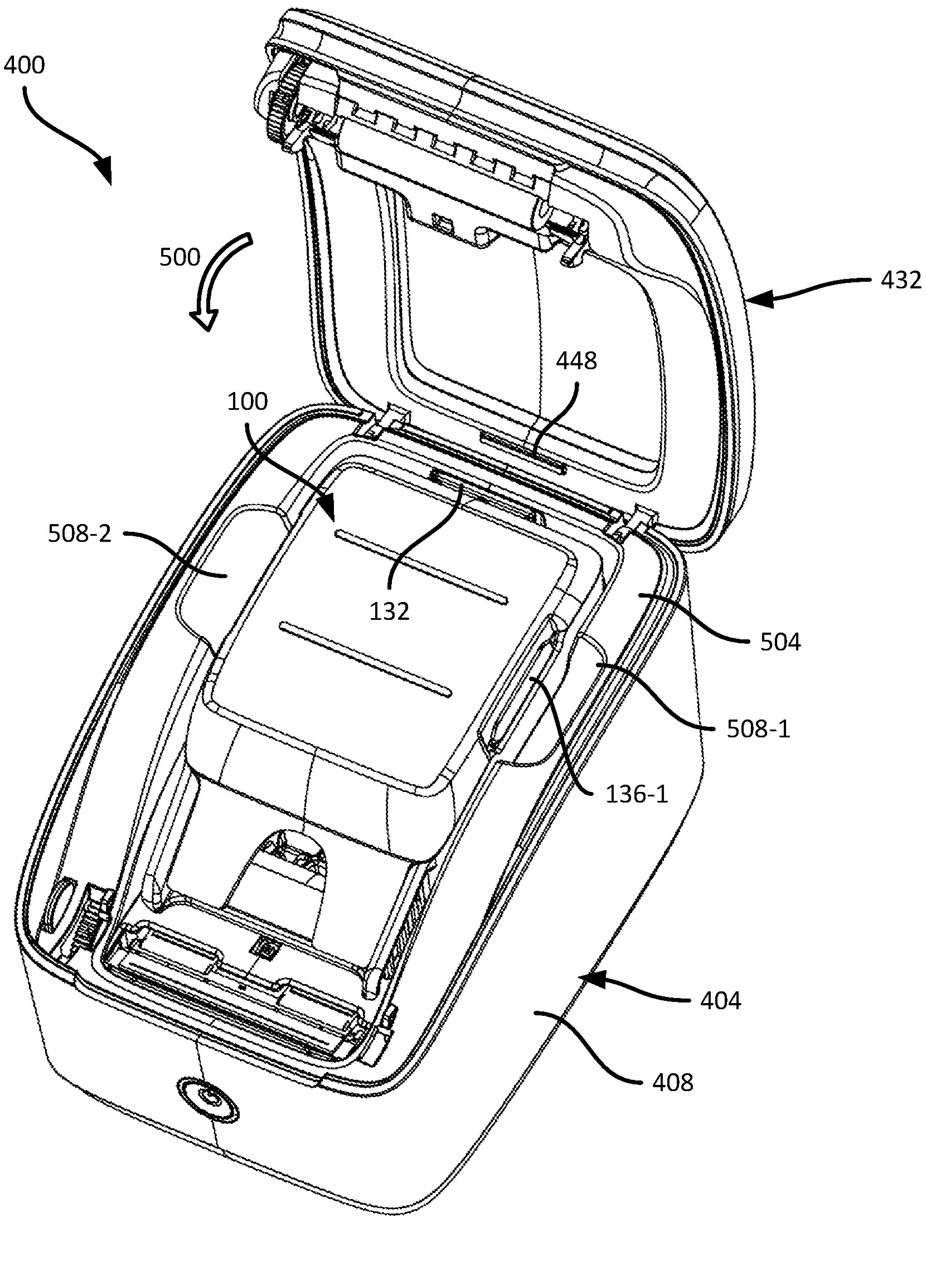
FIG. 5 is a diagram of the printer of FIG. 4 with the cartridge of FIG. 1 installed therein.

Turning to FIG. 5, the cartridge 100 is illustrated in an installed position within the enclosure of the printer 400. As seen in FIG. 5, when the lid 432 is rotated to the closed position in the direction 500, the pressure bar 448 is brought into engagement with the ledge 132 and exerts downward pressure on the ledge 132. Such downward pressure is transferred via the previously mentioned load path, to the circuit 228 to drive the circuit 228 into engagement with the interface 444 of the printer 400.

In other examples, the pressure bar 448 and the ledge 132 may be configured such that only certain portions of the pressure bar 448 contact certain portions of the ledge 132. For example, the pressure bar 448 may be shaped such that the end regions contact the ends of the ledge 132, while the central region of the pressure bar 448 and the ledge 132 do not come into contact. In further examples, the ends of the pressure bar 448 can be configured to crush the ends of the ledge 132 to retain the cartridge 100. For example, the pressure bar 448 can extend further into the enclosure than illustrated in FIG. 4 (when the lid 432 is closed), as well as forward of the central portion of the ledge 132 such that the pressure bar 448 contacts only the sides of the ledge 132.

The printer 400 also includes features to facilitate the installation and removal of the cartridge. In particular, the printer 400 includes an upper wall 504 joining the outer walls 408 with the inner walls forming the enclosure that holds the cartridge 100. The printer 400 includes at least an indentation at the intersection of the upper wall and each side wall 412. In the illustrated example, the printer 400 includes a first indentation 508-1, and a second indentation 508-2, at the intersections of the side walls 412-1 and 412-2 with the upper wall 504, respectively. The indentations 508, as will be apparent from FIG. 5, are positioned so as to lie adjacent to the grips 136 of the cartridge. The indentations 508 enable an operator of the printer 400 to insert fingers between the side walls 412 and the cartridge 100, to grasp the cartridge (e.g. by the grips 136) and withdraw the cartridge 100 from the printer 400.

Figure 6:
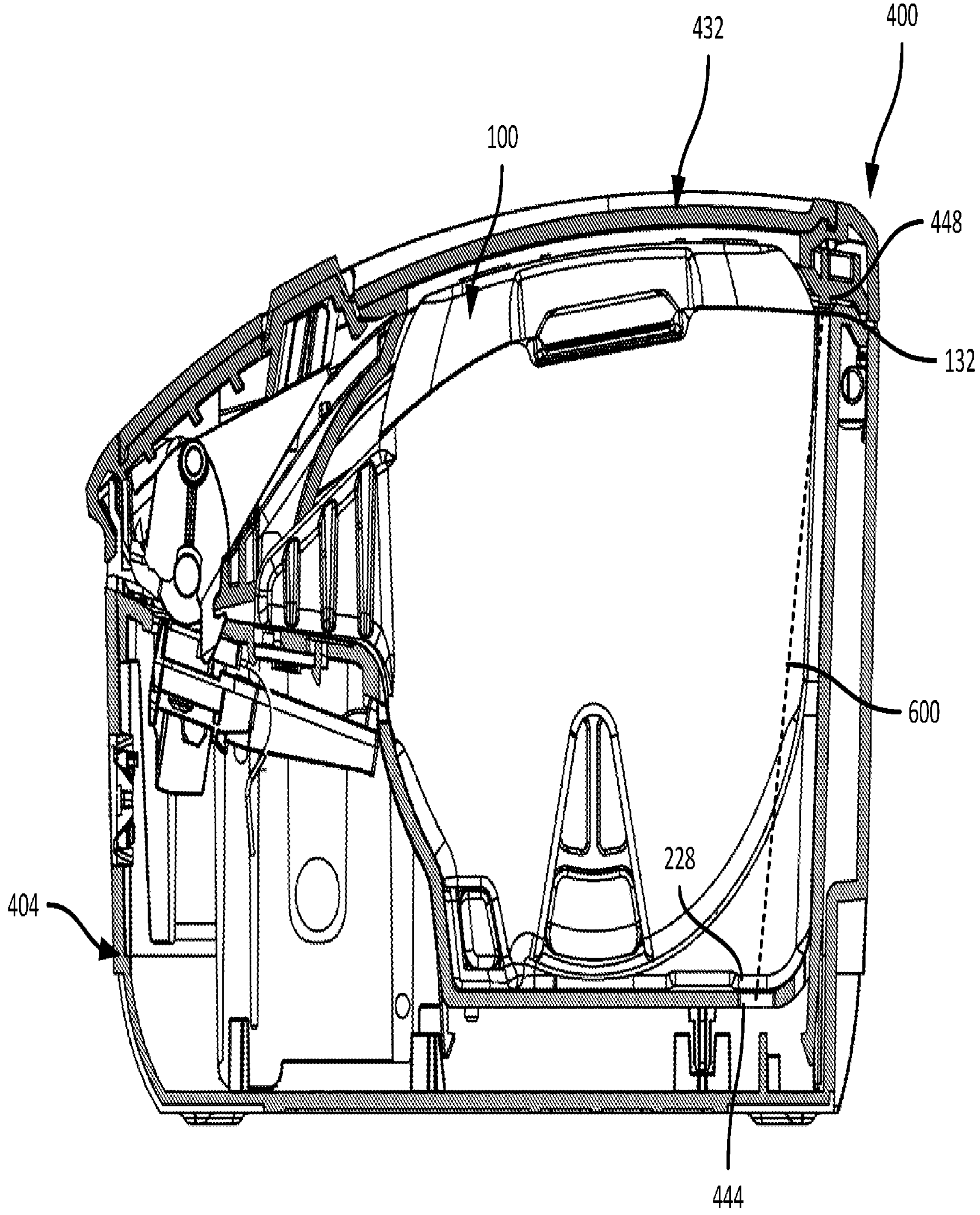
FIG. 6 is a cross section of the printer and cartridge of FIG. 5, with the lid of the printer in a closed position.

FIG. 6 illustrates a cross section of the printer 400 with the cartridge 100 installed therein, showing the pressure bar 448 in contact with the ledge 132, and the relative positions of the circuit 228 and the interface 444. As shown in FIG. 6, the load path 600 between the ledge 132 and the circuit 228 is substantially vertical.

Figure 7:
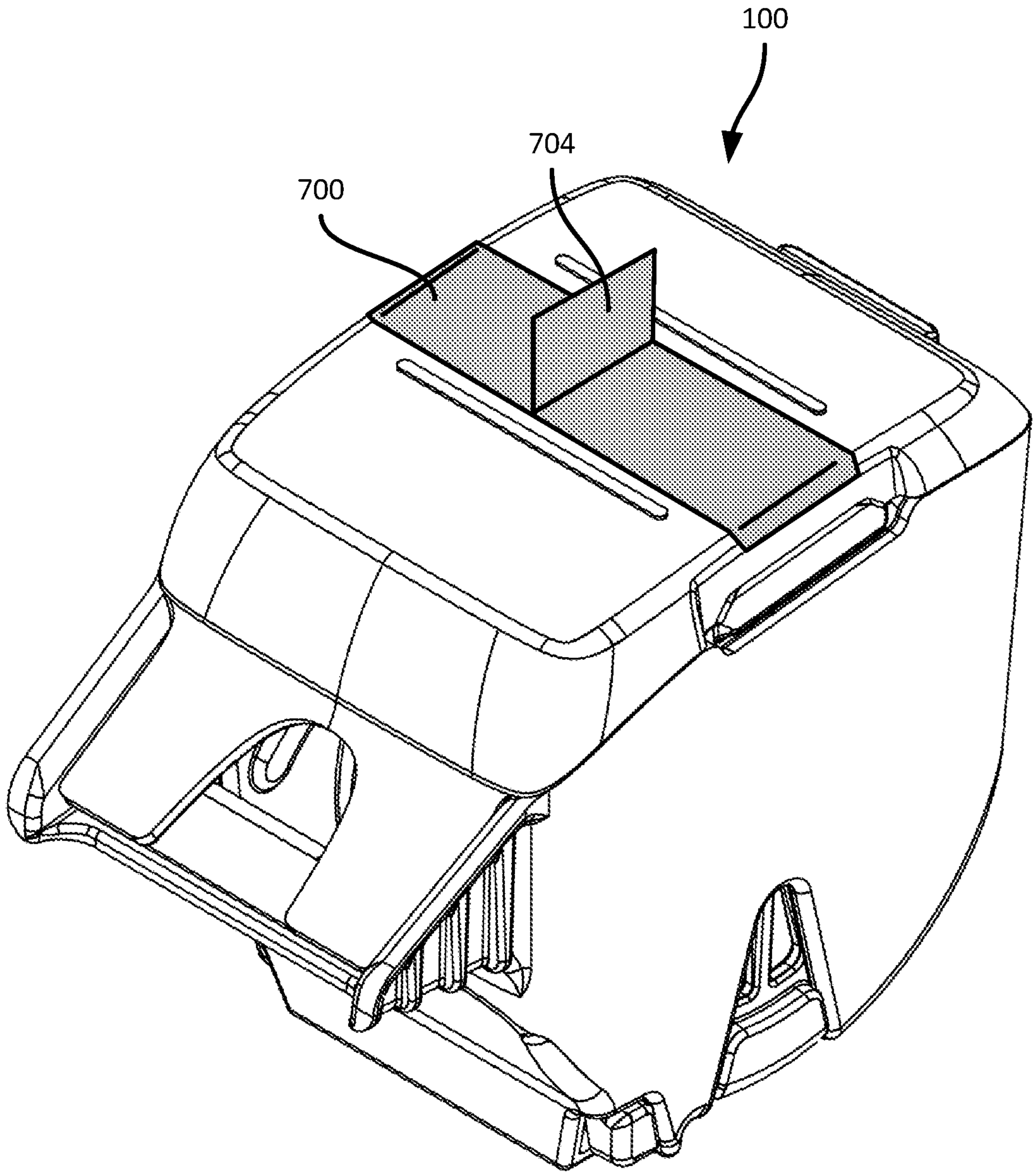
FIG. 7 is an isometric view of a further media cartridge, taken from above.

Other examples of guide features are contemplated. For example, as shown in FIG. 7, the above-mentioned label 700 applied to the cartridge 100 may include a folded region 704 at the center of the cartridge 100. The fold 704 thus forms a tab extending up from the top of the cartridge 100, enabling the tab to be grasped to lift the cartridge 100. In other examples, such a tab may be provided in a manner other than a fold in the label 700. For example, the label 700 can include a tab affixed thereto. In other examples, the cartridge 100 itself can include a tab formed integrally with the cover 108. In further examples, the label 700 can extend onto the sidewalls of the cartridge 100, rather than ending at the edges of the cover 108, as shown in FIG. 7.

Figure 8:
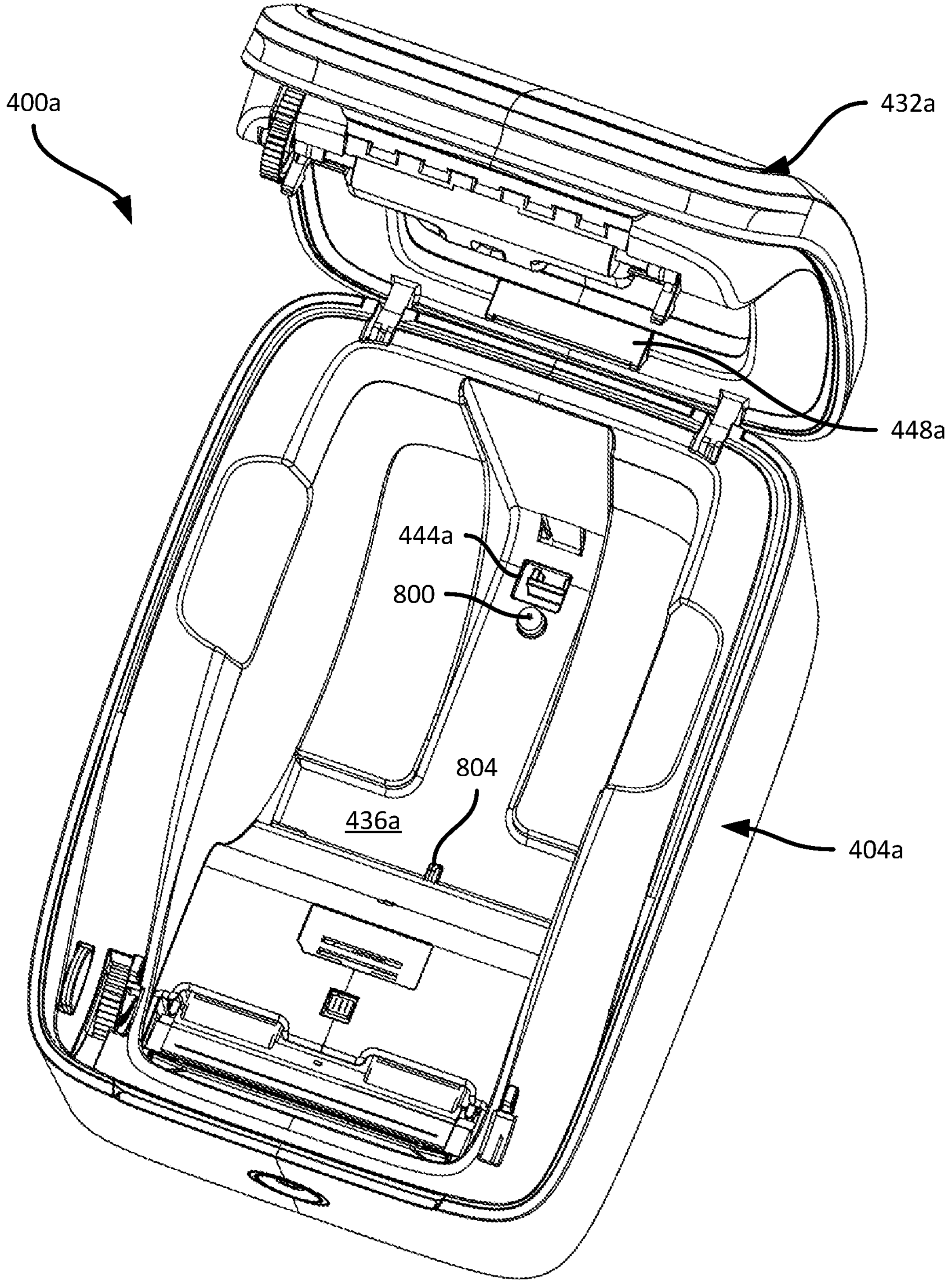
FIG. 8 is a diagram of another example printer.

In further examples, the cartridge 100 and the printer 400 can include additional alignment features to maintain the position of the cartridge 100 within the printer 400 and, in turn, maintain the position of the circuit 228 relative to the interface 444. Turning to FIG. 8, an example printer **400*a* is illustrated, including a housing 404*a* and a lid 432*a*. With the exception of the features noted below, the components of the printer 400*a* are as described above in connection with the printer 400**.

The printer **400*a* includes a pin 800 adjacent to the interface 444*a*, as well as a second pin or ridge 804 at a forward end of the alignment channel 436*a*. The pin 800 and the ridge 804 extend upward from a lower surface of the enclosure defined within the housing 404*a*, and engage with corresponding hole and slot features of a cartridged, to be discussed below. In particular, the pin 800 and the ridge 804 enable the printer 400*a* to maintain an alignment of the cartridge under varying environmental conditions. The cartridge may be manufactured from paperfoam or other similar materials, and may therefore expand or contract depending on the temperature and humidity of the operating environment. Such expansion and contraction can lead to misalignment of the cartridge, resulting in sub-optimal print quality and/or disengagement of the circuit 228 with the interface 444*a***.

Placement of the pin 800 adjacent to the interface **444*a* constrains the position of the cartridge near the circuit 228 such that even in the presence of contraction or expansion of cartridge material, movement of the circuit 228 itself is constrained. Further, the pin 800 and ridge 804 are aligned with the direction of travel of the media, such that expansion or contraction of the cartridge in response to environmental conditions is less likely to rotate the cartridge within the printer 400*a* and dispense media in a direction that is not parallel with the media path defined by the printer 400*a***.

FIG. 8 also shows that the lid **432*a* of the printer 400*a* includes a pressure bar 448*a* that extends further from the inner surface of the lid 448 than the pressure bar 448 described earlier. The increased depth of the pressure bar 448*a* enables consistent contact with the cartridge under various environmental conditions, e.g. by either pressing onto, or crushing (depending on the environmentally-modified size of the cartridge) the ledge 132** as mentioned earlier.

Figure 9:
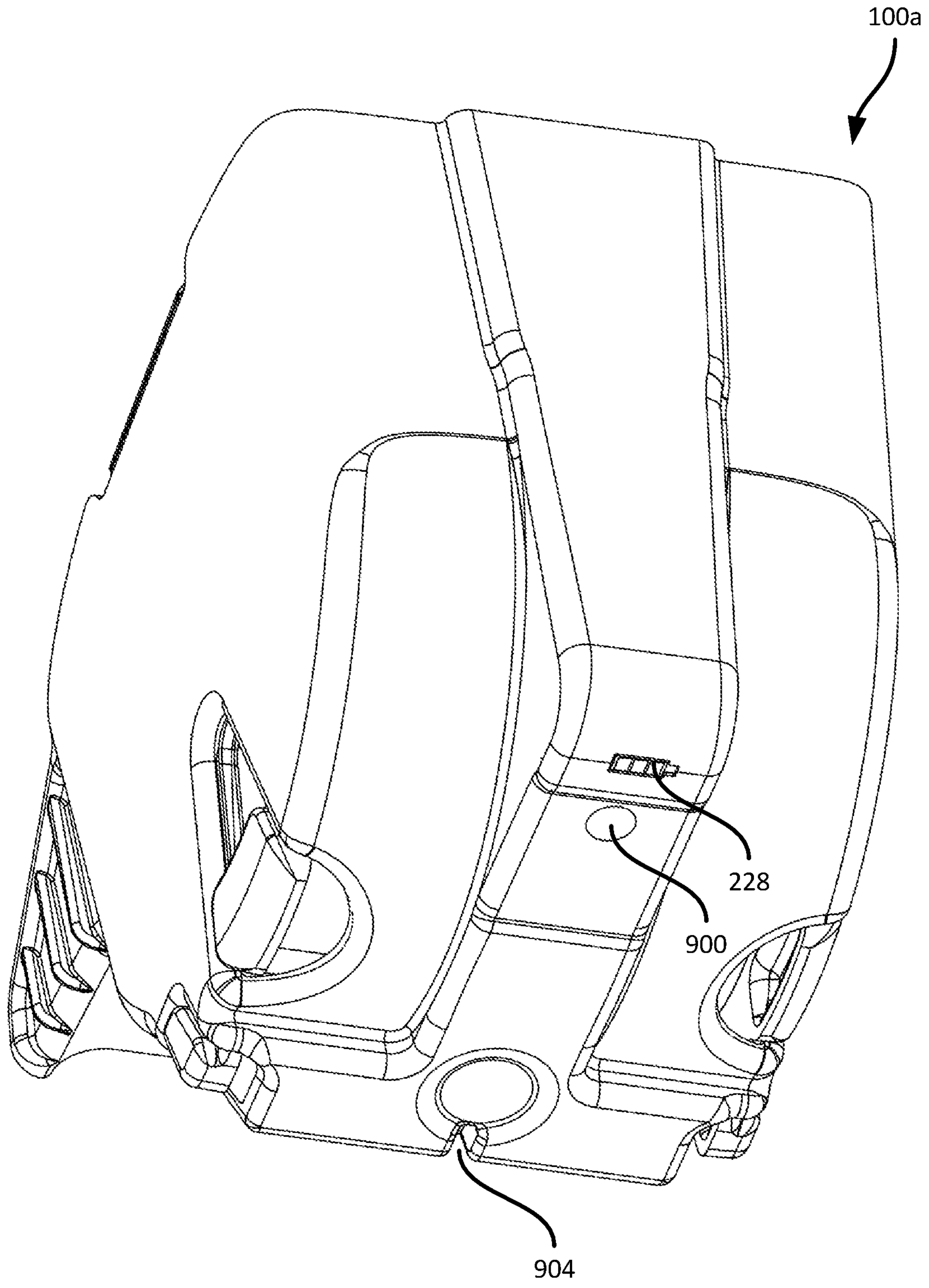
FIG. 9 is a diagram of a media cartridge for use with the printer of FIG. 8, viewed from below.

Turning to FIG. 9, a cartridge **100*a* for use with the printer 400*a* is illustrated from below. The cartridge 100*a*, in addition to the features of the cartridge 100 described earlier, includes a hole 900 and a slot 904 configured to receive the pin 800 and the ridge 804, respectively. As seen in FIG. 9, the hole 900 is adjacent the circuit 228**.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way, but may also be configured in ways that are not listed.

It will be appreciated that some embodiments may be comprised of one or more specialized processors (or “processing devices”) such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A printer, comprising:

a housing defining a media enclosure configured to receive a media cartridge, the media enclosure having a lower wall to support the media cartridge, opposing side walls, a rear wall and a forward wall defining a media outlet;

a lid rotatably coupled to the housing and movable between a closed position to enclose the media enclosure, and an open position;

an electronic interface at the lower wall, configured to engage with an identification chip of the media cartridge;

a contact region protruding from an inner surface of the lid, the contact region configured to exert a downward pressure on a ledge of the media cartridge when the lid is in the closed position;

wherein the electronic interface is aligned with the ledge to transfer the downward pressure from the contact region to the electronic interface via the identification chip when the lid is in the closed position.

2. The printer of claim 1, wherein the housing comprises:

a set of outer walls surrounding the lower wall, the side walls, the rear wall, and the forward wall;

an upper wall joining the outer walls with the side walls of the media enclosure; and an indentation defined at the intersection of the upper wall and each side wall to facilitate grasping of the media cartridge.

3. The printer of claim 1, further comprising:

at least one of (i) a pin extending from the lower wall adjacent to the electronic interface, for engaging with a hole of the media cartridge, or (ii) a ridge extending from a forward portion of the lower wall for engaging with a slot of the media cartridge.

4. The printer of claim 1, further comprising:

a rear channel within the housing, the rear channel configured to engage with an alignment spine of the media cartridge.

5. The printer of claim 1, further comprising:

a lower channel within the housing configured to align with an alignment ridge of the media cartridge.

6. The printer of claim 1, further comprising:

a platen; and a print head configured to press against the platen to create a nip which draws media from the media cartridge.

7. The printer of claim 1, wherein the contact region on the inner surface of the lid is a pressure bar.

8. The printer of claim 1, further comprising:

at least one of (i) a pin extending from the lower wall adjacent to the electronic interface, for engaging with a hole of the media cartridge, or (ii) a ridge extending from a forward portion of the lower wall for engaging with a slot of the media cartridge.

9. The printer of claim 1, further comprising:

a rear channel within the housing, the rear channel configured to engage with an alignment spine of the media cartridge.

10. The printer of claim 1, further comprising:

a lower channel within the housing configured to align with an alignment ridge of the media cartridge.

11. The printer of claim 1, further comprising:

a platen; and a print head configured to press against the platen to create a nip which draws media from the media cartridge.

12. The printer of claim 1, wherein the contact region on the inner surface of the lid is a pressure bar.

13. A printer, comprising:

a housing defining a media enclosure configured to receive a media cartridge, the media enclosure having a lower wall to support the media cartridge, opposing side walls, a rear wall and a forward wall defining a media outlet;

a set of outer walls surrounding the lower wall, the side walls, the rear wall, and the forward wall;

an upper wall joining the outer walls with the side walls of the media enclosure; and an indentation defined at the intersection of the upper wall and each side wall to facilitate grasping of the media cartridge;

a lid rotatably coupled to the housing and movable between a closed position to enclose the media enclosure, and an open position;

an electronic interface at the lower wall, configured to engage with an identification chip of the media cartridge;

a contact region on an inner surface of the lid, the contact region configured to exert a downward pressure on the media cartridge when the lid is in the closed position;

wherein the electronic interface is aligned with a ledge of the media cartridge to transfer the downward pressure from the contact region to the electronic interface via the identification chip.

* * * * *